(No Model.) 2 Sheets—Sheet 1.

T. B. ATTERBURY.
GLASS MOLD.

No. 511,491. Patented Dec. 26, 1893.

WITNESSES
N. L. Gill
H. M. Corwin

INVENTOR
Thomas B. Atterbury
by his Attorneys
W. Bakewell & Sons (No Model.) 2 Sheets—Sheet 2.

T. B. ATTERBURY.
GLASS MOLD.

No. 511,491. Patented Dec. 26, 1893.

WITNESSES
N. L. Gill.
H. M. Corwin

INVENTOR
Thomas B. Atterbury
by his Attorneys
W. Bakewell + Sons.

UNITED STATES PATENT OFFICE.

THOMAS B. ATTERBURY, OF PITTSBURG, PENNSYLVANIA.

GLASS-MOLD.

SPECIFICATION forming part of Letters Patent No. 511,491, dated December 26, 1893.

Application filed March 14, 1893. Serial No. 465,897. (No model.)

*To all whom it may concern:*

Be it known that I, THOMAS B. ATTERBURY, of Pittsburg, in the county of Allegheny and State of Pennsylvania, have invented a new and useful Improvement in Glass-Molds, of which the following is a full, clear, and exact description, reference being had to the accompanying drawings, forming part of this specification, in which—

Figure 1:
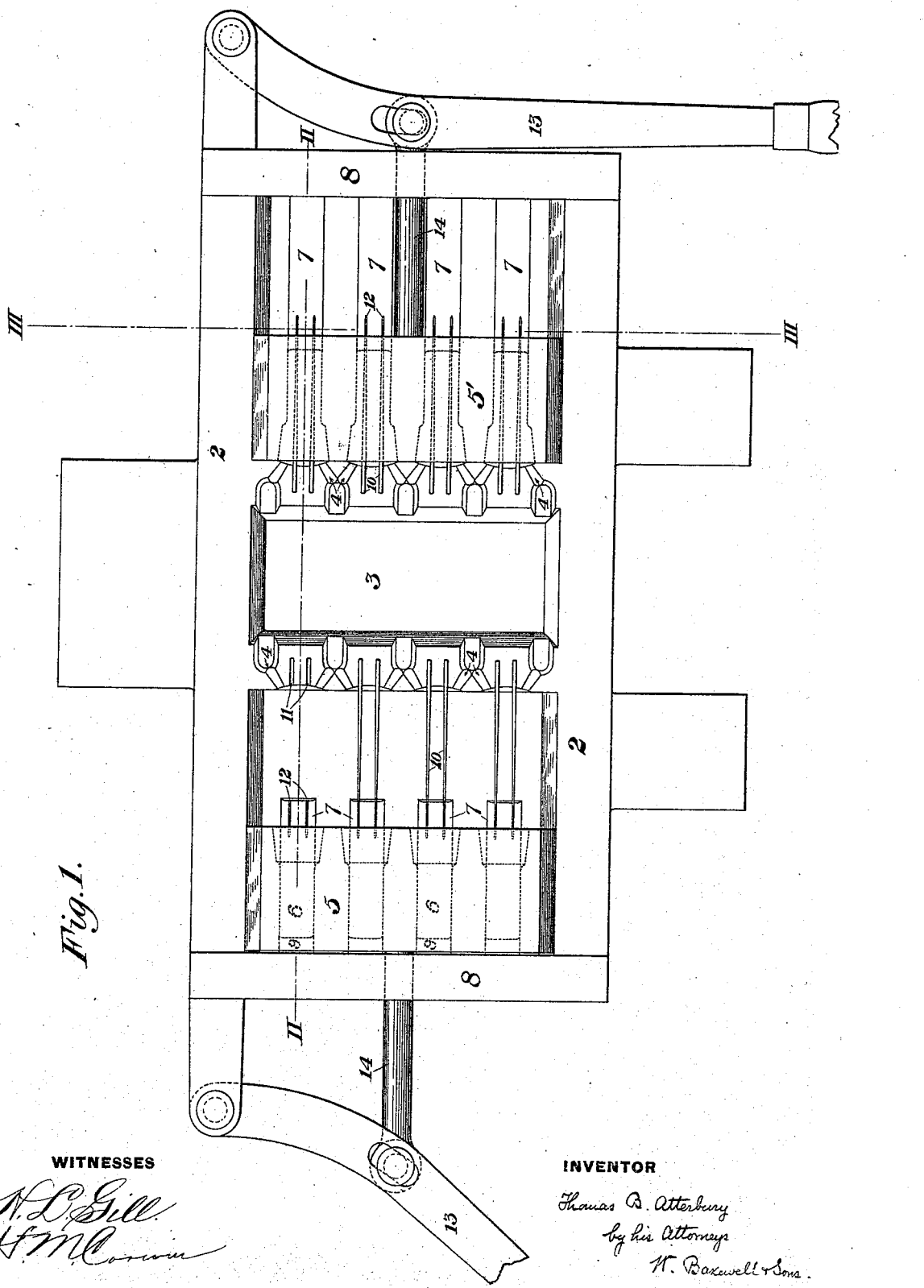
Figure 2:
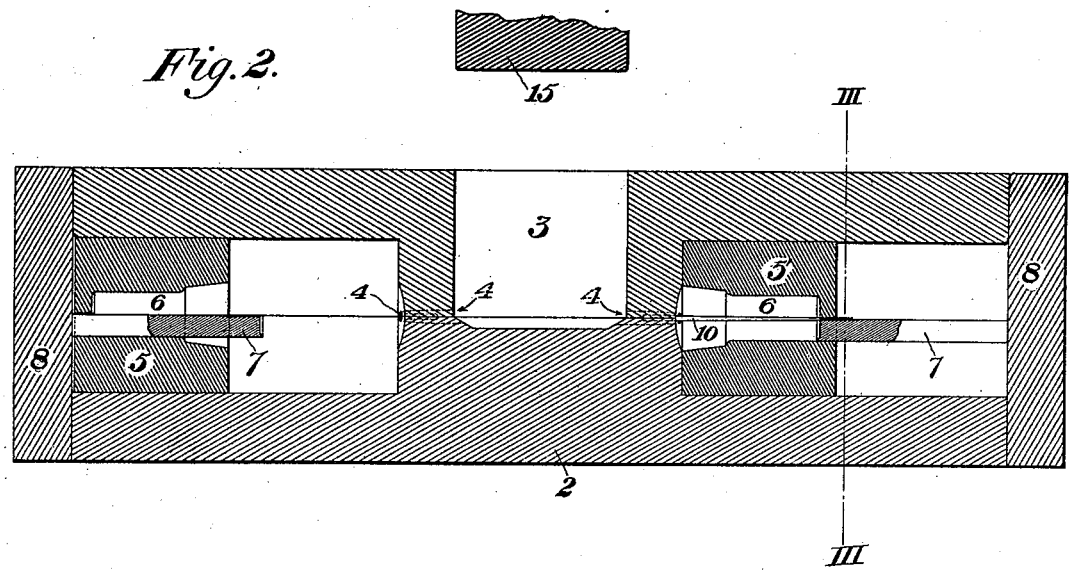
Figure 3:
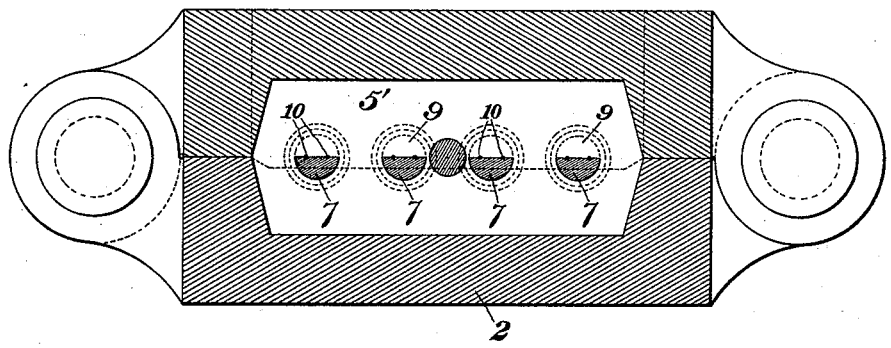
Figure 4:
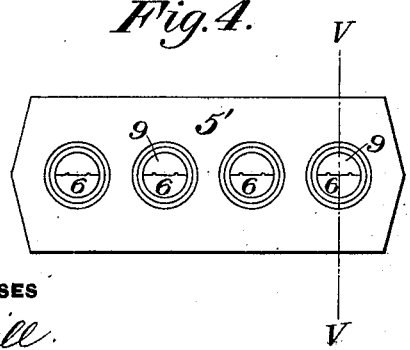
Figure 5:
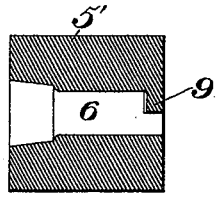

Figure 1 is a plan view of the lower part of the mold. Fig. 2 is a vertical longitudinal section on the line II—II of Fig. 1. Fig. 3 is a vertical cross-section on the lines III—III of Figs. 1 and 2. Fig. 4 is an end view of the movable block 5; and Fig. 5 is a vertical cross-section on the line V—V of Fig. 4.

The purpose for which I have especially designed my invention is for pressing glass-stoppers for use in incandescent electric lights, the object being to produce such stoppers without mold-marks or seams on their sides. Such mold-marks are of serious disadvantage, because they must be ground off before the stopper is used, and their presence renders it difficult to grind the stoppers to the required symmetry. The invention, however, is not limited strictly in its application to stoppers, since, by suitable modifications in the shape of the parts, it may be adapted to the manufacture of other articles of glassware.

The principle of the invention consists in the use in combination with a font-mold, of a removable mold-section constituting a matrix into which the glass is caused to flow, the section being adapted to be stripped longitudinally from the article after it has been formed therein.

It also consists in other features hereinafter described and summarized in the claims, an important one of which is the construction of a mold with a vertical font-cavity and plunger, and matrix-cavities which extend transversely therefrom, instead of extending vertically as in font-molds as ordinarily constructed. By thus arranging the matrix-cavities transversely, they are more conveniently placed, and the operation is facilitated and quickened.

In the drawings I show what I deem to be the best form of apparatus embodying my invention.

2 represents the lower half of a sectional mold, the upper half being a counterpart of it, and being connected thereto by the usual hinges as shown in the drawings. This mold has a font-cavity 3 with gates 4 leading therefrom at one or both sides and adapted to communicate at the outer ends with the matrices in which the glass stoppers are pressed. Said matrices are formed on each side of the font-cavity by a sliding block 5, 5', shown in detail in Figs. 4 and 5, which is perforated with a series of cavities 6 of the form and size desired for the glass stoppers. In each of these cavities fits a longitudinal rod 7, adapted to constitute a stop to enable the block to be stripped from the glass and semi-circular in cross-section so as to fill about one-half of the cavity; and for convenience the rods of each series are connected in comb-fashion to a back or block 8 from which they project in directions parallel to each other.

At the back end of each of the cavities 6 is a semi-circular partition 9, which, in conjunction with the bar 7, substantially fills the rear of said cavity, leaving only a small intervening crevice which serves the function of a vent, as hereinafter explained.

When the mold is to be put into condition for pressing the glass stoppers therein, the blocks 5 and 5' are moved forward toward the font-cavity, as shown at 5' in Fig. 1, until the inner ends of said blocks reach the ends of the gates 4, where they are stopped by shoulders on the mold 2. When in this position the ends of the bars 7 are at the rear of the cavities 6, and are flush with the inner ends of the semi-circular partitions 9, so that in advance of the ends of the bars 7 and the partitions 9, the cavities 6 are of complete cylindrical form, of proper shape to mold within them the glass stoppers. The inner ends of the cavities, which form the heads of the stoppers, are constituted by the meeting faces of the mold 2, as shown in Fig. 2.

In pressing incandescent lamp-stoppers, in which metallic wires must be embedded in the glass, before advancing the block 5, I lay the wires 10 directly in front of the mold-cavities 6, supporting them at one end in sockets or recesses 11 of the mold 2, and at the other end in similar recesses or sockets 12 of the bars 7, which bars, when the block 5 is retracted, project through and in advance of said block. When the block 5 is now advanced into the position shown at 5', the cavities 6 move over these wires, which then extend therethrough parallel to each other, fitting at one end in the recesses 11, and at the rear end fitting between the bars 7 and the partitions 9 which, by the advance of the block 5, are brought over the end portions of said bars. In order to move the blocks 5, and 5' forward and back, as explained above, I prefer to employ levers 13, connected with the blocks by rods 14. The wires having been laid in position as just described, and the blocks 5, 5', having been advanced into the position shown at 5' in Fig. 1, the mold 2 is closed, a gathering of glass is put in the font-cavity 3, and on the descent of the plunger 15, is pressed through the gates 4 into the cavities in the blocks 5, 5', wherein it flows along the wires, displacing the air and gas before it through the vents above mentioned, and finally, filling the cavities, completes the formation of the stoppers. The mold 2 is then opened and the blocks 5, 5', may be retracted into the position shown at 5 in Fig. 1, and by such retraction they are stripped from the glass stoppers, which are prevented by the ends of the bars 7 from moving back with the blocks. The stoppers may then be lifted out and broken from the glass pieces formed in the gates, and as the mold-cavities are without lateral seams, perfectly seamless and uniform stoppers are produced.

It will be understood that my invention is not limited in its broad statement to the use of a series of mold-cavities at the sides of the font-cavities, nor to the use of cavities on both sides of the font, nor need the block 5 or 5' be adapted to be moved longitudinally when within the mold in order to strip it from the stoppers, since it may be adapted to be lifted out of the mold with the stoppers still contained therein, and to be subsequently stripped from the stoppers. Each block can be made in sections, adapted to be stripped separately from the articles. The construction and arrangement of the parts shown in the drawings are, however, preferable for many reasons and are made the subject of specific claims. The form and arrangement of such parts may be changed in many ways within the scope of my invention, the advantages of which will be appreciated by those skilled in the manufacture of glassware.

I claim—

1. A glass mold having a vertical font-cavity, and a block having a matrix cavity or cavities extending transversely from the font cavity, said block being movable in the direction of length of the cavities to enable it to be stripped from the glass articles; substantially as described.

2. The combination with a glass mold having a font, of a removable mold section undivided lengthwise and constituting a matrix into which the glass is caused to flow, said section being adapted to be stripped longitudinally from the glass article, and a stop made separate from the removable mold section and projecting thereinto lengthwise to hold the glass article while the mold section is stripped therefrom; substantially as described.

3. A glass-mold having a gated font, and a movable block having a series of parallel cavities adapted to register with the gates, and to constitute the matrices, said block being movable longitudinally in the mold to strip it from the articles formed therein; substantially as described.

4. A glass-mold having a gated font, a movable block having a cavity or cavities adapted to register with the gates and to constitute the matrices, and a bar projecting within the cavity and adapted to hold the end of the article when the block is stripped therefrom; substantially as described.

5. The combination with a glass-mold, of a removable mold-section constituting a matrix into which the glass is caused to flow, said section being adapted to be stripped from the rear end of the article after it has been formed therein, and means for holding metal wires in said matrix; substantially as described.

6. A glass-mold having a gated font, a movable block having a cavity or cavities adapted to register with the gates and to constitute the matrices, and means for holding metal wires in said matrices; substantially as described.

7. A glass-mold having a gated font, a movable block having a cavity or cavities adapted to register with the gates and to constitute the matrices, a bar projecting within the cavity and adapted to hold the end of the article when the block is stripped therefrom, said bar partly filling said cavity, and a partition closing the remainder, said bar and partition being adapted to hold an interposed wire or wires and to afford a vent; substantially as described.

8. A glass-mold having a gated font, a movable block having a cavity or cavities adapted to register with the gates and to constitute the matrices, a bar projecting within the cavity and adapted to hold the end of the article when the block is stripped therefrom, said bar partly filling said cavity, and a partition closing the remainder, said bar and partition being adapted to hold an interposed wire or wires; substantially as described.

9. A glass-mold having a gated font, and a longitudinally movable block having a cavity or cavities adapted to register with the gates, and to constitute the matrices for the body of the article, the main mold having a cavity for forming an end of the article; substantially as described.

10. A glass-mold having a gated font, a movable block having a cavity or cavities adapted to register with the gates, and to constitute the matrices, and a stop in the cavity made separate from the movable block, projecting thereinto lengthwise and having means for holding an end of a metal wire or wires, the main mold being adapted to hold the other end thereof; substantially as described.

11. In glass molding apparatus, the combination of a removable mold-section having a matrix in which the glass article is shaped, and a stop, said mold-section being adapted to be stripped from the article over said stop; substantially as described.

In testimony whereof I have hereunto set my hand.

THOS. B. ATTERBURY.

Witnesses:
　THOMAS W. BAKEWELL,
　S. C. MCCANDLESS.